US007571754B2

(12) United States Patent
Ushijima

(10) Patent No.: US 7,571,754 B2
(45) Date of Patent: Aug. 11, 2009

(54) COATING FILM TRANSFER TOOL

(75) Inventor: Jun Ushijima, Tokyo (JP)

(73) Assignee: Plus Stationery Corporation, Tokyo (JP)

( * ) Notice: Subject to any disclaimer, the term of this patent is extended or adjusted under 35 U.S.C. 154(b) by 511 days.

(21) Appl. No.: 11/375,208

(22) Filed: Mar. 15, 2006

(65) Prior Publication Data

US 2007/0113987 A1 May 24, 2007

(30) Foreign Application Priority Data

Nov. 21, 2005 (JP) ............................. 2005-336173

(51) Int. Cl.
*B32B 37/26* (2006.01)
*B26F 3/02* (2006.01)
*B43L 19/00* (2006.01)

(52) U.S. Cl. ......................... 156/523; 156/577; 118/76; 118/257; 242/160.4; 242/171; 242/588.6

(58) Field of Classification Search ................. 156/574, 156/577, 523, 527, 538, 540, 579; 118/76, 118/200, 257; 225/46; 242/160.2, 160.4, 242/170, 171, 588, 588.2, 588.3, 588.6; 206/411
See application file for complete search history.

(56) References Cited

U.S. PATENT DOCUMENTS 5,316,613 A * 5/1994 Samuelson et al. .......... 156/540
5,346,580 A * 9/1994 Elges et al. ................. 156/540
5,507,908 A * 4/1996 Fukushima et al. ......... 156/363
5,512,128 A * 4/1996 Manusch et al. ............ 156/577
5,772,840 A * 6/1998 Morinaga ................... 156/540
6,550,518 B1 * 4/2003 Lee ............................ 156/577
6,951,431 B2 * 10/2005 Rollion ...................... 401/117

FOREIGN PATENT DOCUMENTS

DE 43 22 118 C1 11/1994
EP 0 719 723 A2 7/1996
JP 10-264591 10/1998
JP 11-170770 6/1999

OTHER PUBLICATIONS

Search Report, Application No. 200601409-6, Apr. 18, 2007.

* cited by examiner

*Primary Examiner*—Mark A Osele
(74) *Attorney, Agent, or Firm*—Edwards Angell Palmer & Dodge LLP

(57) ABSTRACT

A coating film transfer tool capable of eliminating a sag when being used, while protecting the transfer tape when not being used. The coating film transfer tool includes: a slide mechanism which causes the transfer head to slide allowing the transfer head to contact with the transfer tape and to protrude from the case in order to perform the transfer, and/or accommodate the transfer head into the case; and a slip mechanism which, when a sliding operation to cause the transfer head to protrude is performed by the slide mechanism, releases interlocking between the supply bobbin and the supply reel, and, when the supply bobbin rotates in the direction of winding up the transfer tape by running of the transfer tape at a time of the transfer, rotates the supply reel and the supply bobbin in interlocking with each other, the slip mechanism being interposed between the supply bobbin and the supply reel, in which, when a sliding operation to accommodate the transfer head is performed by the side mechanism, the slide mechanism is engaged with the supply reel, and rotates the supply reel in reverse.

7 Claims, 11 Drawing Sheets

COATING FILM TRANSFER TOOL

BACKGROUND OF THE INVENTION

1. Field of the Invention

The present invention relates to a construction of a coating film transfer tool for use in applying a paste and correcting a literal error, the coating film transfer tool being structured by winding a transfer tape having a paste provided on a surface of a resin tape or a paper tape around a supply bobbin.

2. Description of the Related Art

Heretofore, a coating film transfer tool for use in applying a paste and correcting a literal error has been proposed. As a construction of such a coating film transfer tool, there is generally known a construction which includes: a supply reel onto which a supply bobbin having an unused transfer tape wound around the supply bobbin is attached; a take-up reel onto which a take-up bobbin having the transfer tape used after being drawn out of the supply bobbin wound around the take-up bobbin is attached; and reel interlocking means for interlocking the supply reel and the take-up reel with each other, in which a slip mechanism which absorbs a difference in tape feeding amount between the supply reel and the take-up reel and constantly keeps tension of the transfer tape is provided on a shaft portion of the supply reel.

Then, as the transfer tape for use in the coating film transfer tool, one has been used, in which, on a surface of a resin tape or a paper tape which serves as a feeding medium, a transfer film easily peelable from the surface of the tape is provided. This transfer film has been made available by being wound around the supply bobbin made of resin or paper.

In the coating film transfer tool as described above, when the transfer tape sags without being tensioned on a transfer head, the transfer tape cannot be appropriately pressed against a transfer target, so the coating film cannot be transferred thereto. Therefore, the sag of the transfer tape has been eliminated by rotating the supply reel, the take-up reel, a rotating member (take-up flange) directly coupled thereto, or the like, thereby winding up the transfer tape to give tension thereto (see JP 10-264591 A).

However, it has been burdensome work for a user, every time the sag occurs in the transfer tape, to rotate the supply reel, the take-up reel, the rotating member directly coupled thereto, or the like to wind up the transfer tape.

Further, the sag of the transfer tape significantly occurs in the coating film transfer tool with a construction in which the transfer head is always exposed, and accordingly, a coating film transfer tool including a protection member for protecting the transfer head and also the transfer tape itself has been developed. However, such a coating film transfer tool does not achieve a construction to bring a great deal of effect for eliminating the sag of the transfer tape.

SUMMARY OF THE INVENTION

The present invention has been made with a view toward the above-mentioned problems, and therefore it is an object of the present invention to provide a coating film transfer tool capable of eliminating a sag when being used, while protecting a transfer tape when not being used.

In order to solve the above-described problems, according to a first aspect of the present invention, a coating film transfer tool includes:

a case including:

a supply bobbin which is rotatable, and has a transfer tape wound therearound;

a supply reel which is rotatable, and has the supply bobbin attached thereto;

a take-up bobbin which is rotatable only in a direction of winding up the transfer tape, and has the transfer tape used after being drawn out of the supply bobbin wound therearound;

a take-up reel which rotates in a direction of winding up the transfer tape in interlocking with the take-up bobbin;

reel interlocking means for interlocking the supply reel and the take-up reel with each other; and a transfer head for transferring a coating film to a transfer target surface by pressing the transfer tape thereagainst and making the transfer tape run, a slide mechanism which causes the transfer head to slide, thereby allowing the transfer head to contact with the transfer tape and to protrude from the case in order to perform the transfer, and thereby accommodate the transfer head into the case; and a slip mechanism which, when a sliding operation to cause the transfer head to protrude is performed by the slide mechanism, releases interlocking between the supply bobbin and the supply reel, and, when the supply bobbin rotates in the direction of supplying the transfer tape by running of the transfer tape at a time of the transfer, rotates the supply reel and the supply bobbin in interlocking with each other, the slip mechanism being interposed between the supply bobbin and the supply reel, and is characterized in that, when a sliding operation to accommodate the transfer head is performed by the slide mechanism, the slide mechanism is engaged with the supply reel, and rotates the supply reel reversely, and thereby the following effect is obtained, that is, capable of eliminating the sag when being used, while protecting the transfer tape by the slide mechanism when not being used.

BRIEF DESCRIPTION OF THE DRAWINGS

In the accompanying drawings:

FIG. 3A is a structural view of a case opened when a tape unit is attached thereto, and FIG. 3B is a structural view of the case opened when the tape unit is not attached thereto;

FIG. 4A is a side view of a side of the tape unit opposed to a case lower portion, and FIG. 4B is a side view of a side of the tape unit opposed to a case upper portion;

FIG. 5A is a perspective view of a take-up reel showing a side opposed to the case lower portion, FIG. 5B is a perspective view of the take-up reel showing a side opposed to the case upper portion, and FIG. 5C is a perspective view of the tape unit including a take-up bobbin to be engaged with the take-up reel;

FIG. 6A is a construction view of a spring portion; and FIG. 6B is a construction view of an operating portion;

DETAILED DESCRIPTION OF THE PREFERRED EMBODIMENTS

A description will be made below in detail of a coating film transfer tool according to the present invention with reference to the drawings while mentioning a preferred embodiment. (Summary of Entire Construction)

Figure 1:
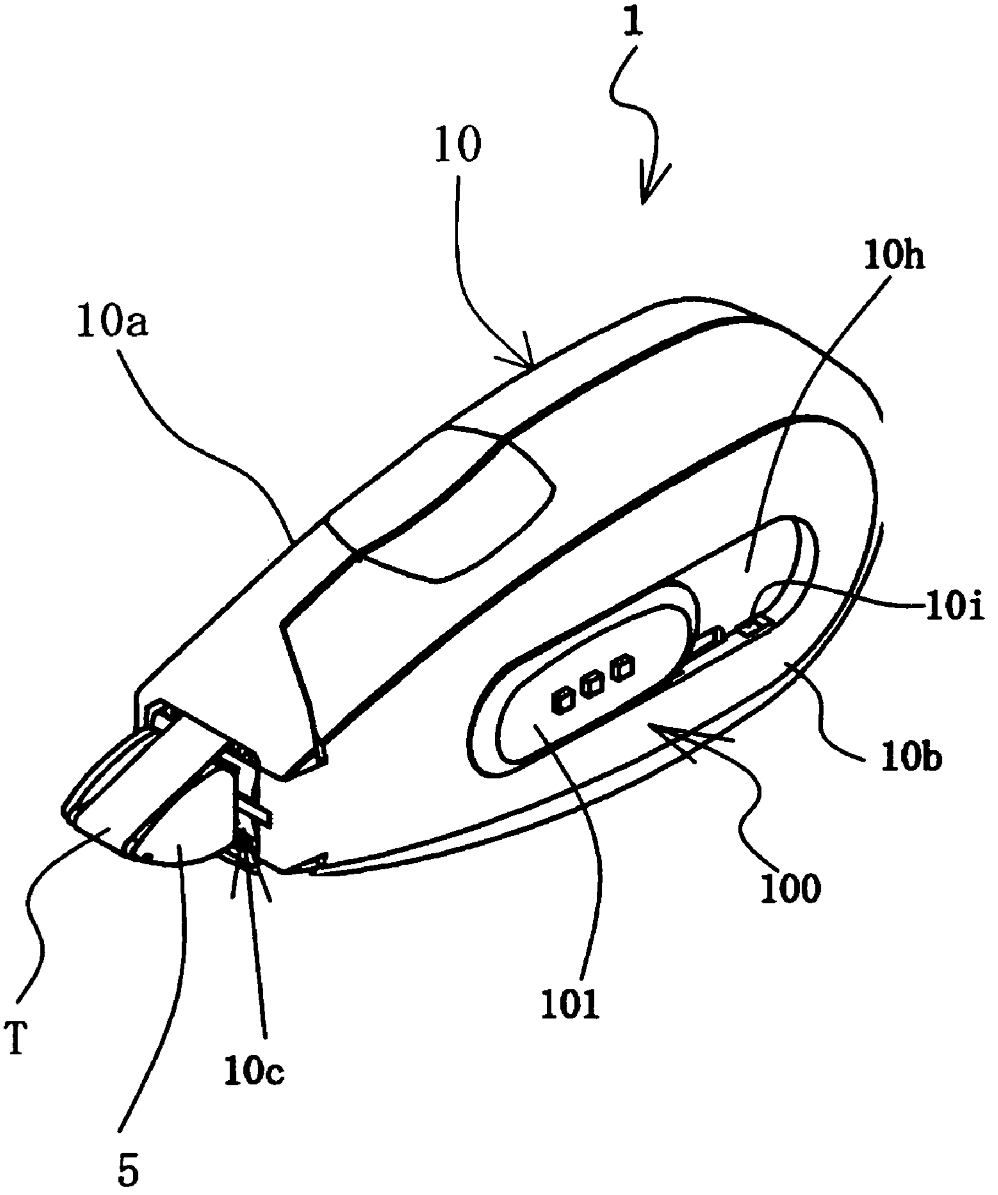
FIG. 1 is a perspective view showing an exterior appearance of a construction of a coating film transfer tool according to an embodiment of the present invention.

FIG. 1 is a perspective view showing an exterior of a construction of the coating film transfer tool according to an embodiment of the present invention. As shown in FIG. 1, a case upper portion 10*a* and a case lower portion 10*b* which function as a case 10 of a coating film transfer tool 1 of this embodiment are formed so as to be capable of being assembled with each other. A tape unit 4 is built in an inside of the case 10. The tape unit 4 is structured by winding a transfer tape T in which a transfer layer formed of a paste or the like is provided on a surface of a feeding tape. The feeding tape functions as a medium for feeding the transfer layer.

The coating film transfer tool according to the present invention comprises a transfer head 5 which tensions the transfer tape T thereon. A user slides an operating portion 101 composed of a slide knob or the like in a direction toward an opening portion 10*c* of the case 10 and a direction reverse thereto, thus making it possible to cause the transfer head 5 to protrude from the case 10, and to accommodate the transfer head 5 into the case 10. With regard to how to use the coating film transfer tool, by sliding the operating portion 101, the transfer tape is suspended by the transfer head 5, and a contact portion of the suspended transfer tape is pressed against a surface to which the transfer is effected (a transfer target) such as a paper surface, followed by a movement (that is, the transfer tape is made to run), and a transfer surface is transferred to such a transfer target surface. In this "transfer" operation, the transfer tape T is drawn out of a supply bobbin 21.

Note that, in the description of this embodiment, a direction in which the transfer head 5 protrudes outside the opening portion 10*c* of the case 10 is defined as a "protruding direction", and a direction in which the transfer head 5 is accommodated into the case 10 is defined as an "accommodating direction".

Figure 2:
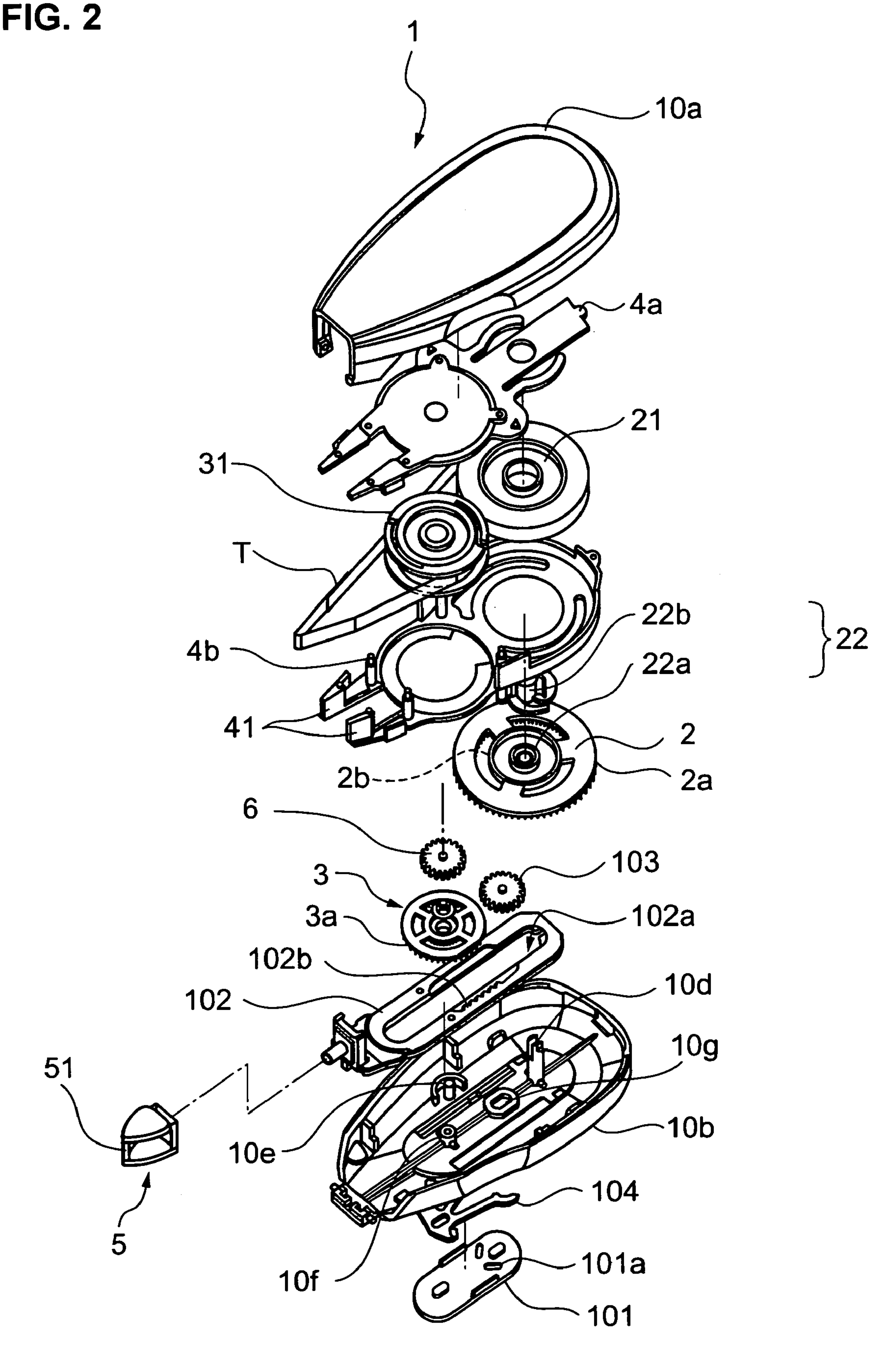
FIG. 2 is an exploded perspective view showing a construction the coating film transfer tool according to the embodiment of the present invention.

FIG. 2 is an exploded perspective view of the coating film transfer tool 1 in this embodiment. As shown in FIG. 2, in the case 10 composed of the case upper portion 10*a* and the case lower portion 10*b*, the coating film transfer tool 1 is composed of the tape unit 4 which includes therein a supply bobbin 21 having the transfer tape T wound therearound and a take-up bobbin 31 for winding up the transfer tape T therearound, a supply reel 2 engaged with the supply bobbin 21 to transmit a rotation thereof to the supply bobbin 21, a take-up reel 3 engaged with the take-up bobbin 31 to transmit a rotation thereof to the take-up bobbin 31, the transfer head 5, and the slide mechanism coupled to the transfer head 5 and slides the transfer head 5 to the inside and outside of the case 10 to control transmission of the rotations to the supply bobbin 21 and the take-up bobbin 31 which are built in the tape unit 4 in response to the sliding of the transfer head 5.

Figure 3A:
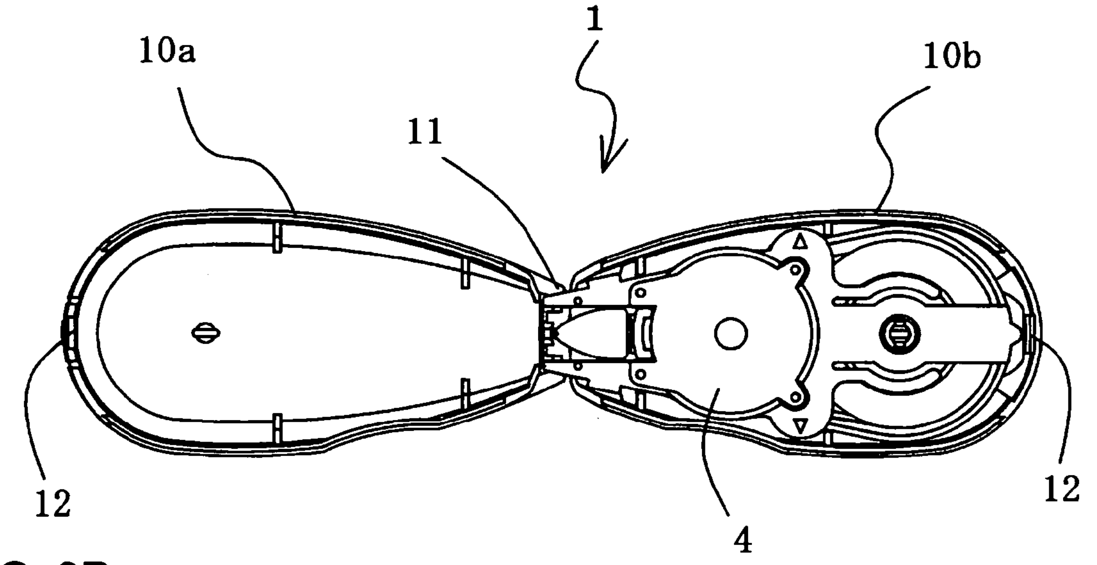
FIGS. 3A and 3B are views each showing a construction of a case of the coating film transfer tool according to the embodiment of the present invention.
Figure 3B:
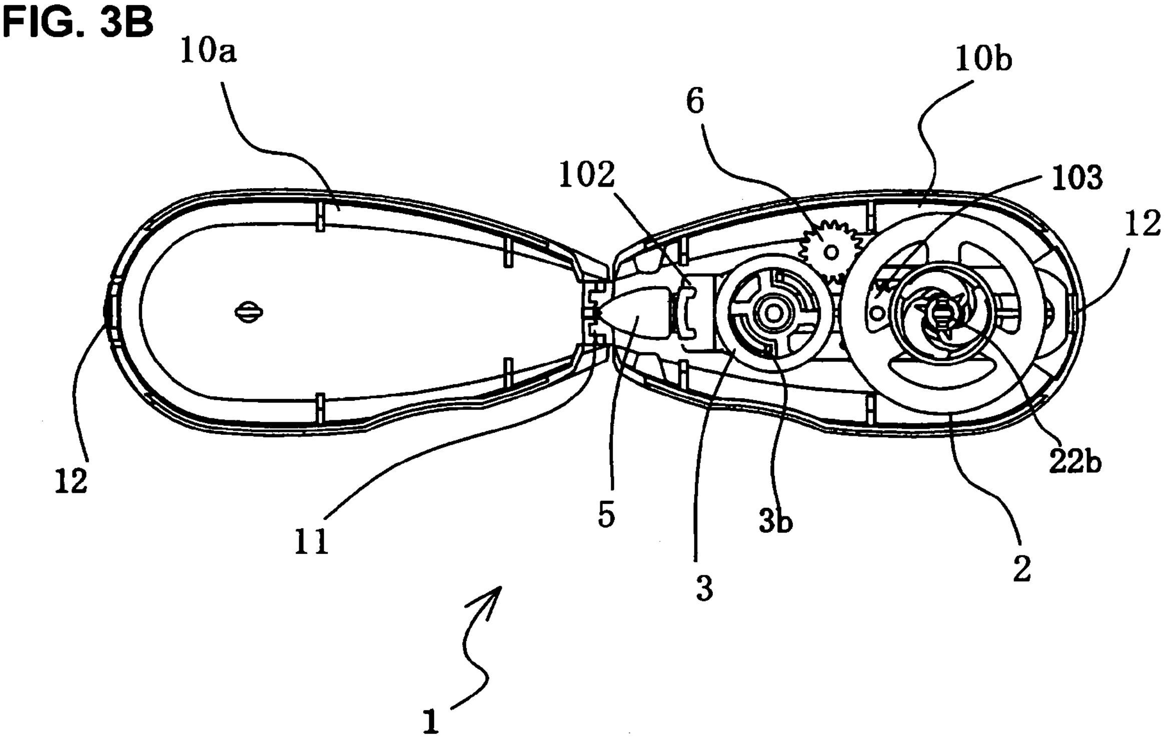

FIGS. 3A and 3B are views showing constructions of the case upper portion 10*a* and the case lower portion 10*b* which construct the coating film transfer tool 1 in this embodiment. As shown in FIGS. 3A and 3B, in the coating film transfer tool 1, the case upper portion 10*a* and the case lower portion 10*b* are coupled to each other at a hinge portion 11 so as to divide the rectangular opening portion 10*c* (see FIG. 1) into one linear portion and a U-shaped portion. Further, on an end port ion of the coating film transfer tool 1 opposite to the hinge portion 11 in the accommodating direction, engagement portions 12 and 12 for engaging and fixing the case upper portion 10*a* and the case lower portion 10*b* to each other are provided. Here, the case upper portion 10*a* and the case lower portion 10*b* are rotatable with respect to each other at the hinge portion 11.

In the case of attaching/detaching the tape unit 4, the engagement portions 12 and 12 are released in a state where the case lower portion 10*b* is fixed in position, the case upper portion 10*a* is rotated in the protruding direction around the hinge portion 11 as an axis, and the case 10 is opened. Meanwhile, after the tape unit 4 is attached to the case lower portion 10*b*, the case upper portion 10*a* is rotated in the accommodating direction around the hinge portion 11 as the axis again, and the stacked case upper portion 10*a* and case lower portion 10*b* are engaged with each other at the engagement portions 12 and 12, followed by the fixing therebetween. (Construction of Tape Unit)

Figure 4A:
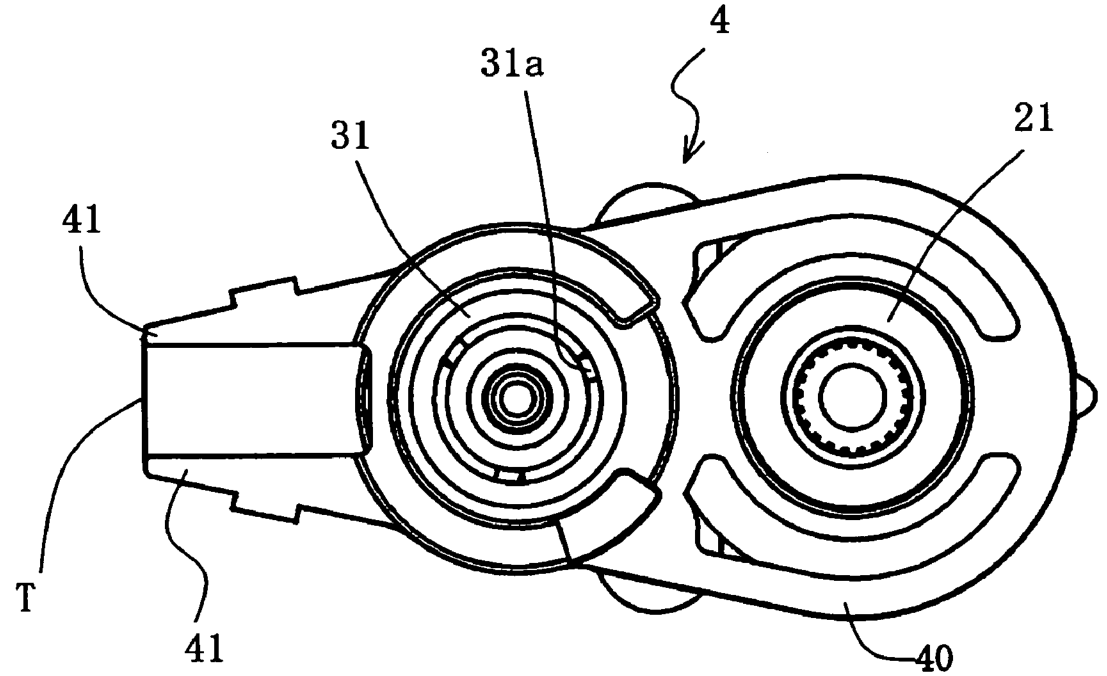
FIGS. 4A and 4B are views each showing a construction of the tape unit of the coating film transfer tool according to the embodiment of the present invention.
Figure 4B:
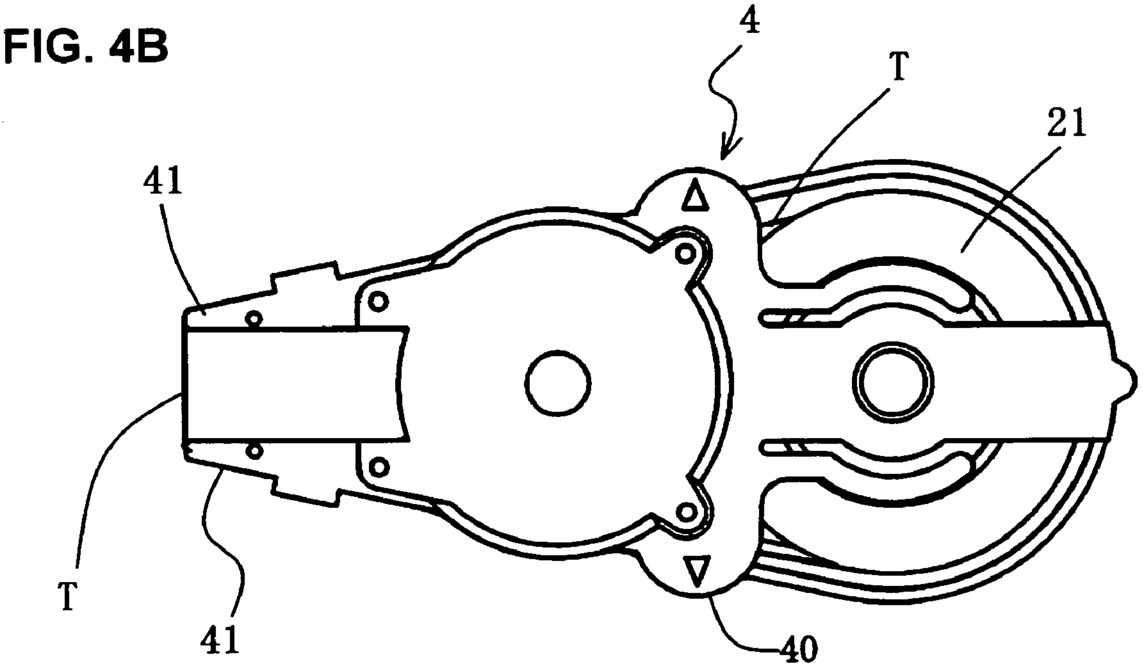

FIGS. 4A and 4B are side views each showing a construction of the tape unit 4 in this embodiment: FIG. 4A is a side view of the tape unit 4 showing a side opposed to the case lower portion 10*b*; and FIG. 4B is a side view of the tape unit 4 showing a side opposed to the case upper portion 10*a*. Note that the tape unit 4 is attached to the case 10 while opposing the surface thereof on the side shown in FIG. 4A to the case lower portion 10*b*.

As shown in FIGS. 4A and 4B, the tape unit 4 makes a form sandwiched by two resin plates 40, in which the supply bobbin 21 having the transfer tape T wound therearound and the take-up bobbin 31 for winding therearound the transfer tape T used after being drawn out of the supply bobbin 21 are arrayed in parallel. Accordingly, when all the transfer tape T is used up, it is possible to detach the tape unit 4 and to replace the tape unit 4 by a new one, and replacement operation of the transfer tape T is easy.

Each of the supply bobbin 21 and the take-up bobbin 31 is formed into a cylindrical shape through resin molding. Further, as the transfer tape T, one is used, in which the transfer layer formed of the paste is provided on the surface of the feeding tape formed of a resin tape such as a polyester film so as to be peelable from the surface of the transfer tape. Note that a paper tape can also be used as the feeding tape.

Further, in the tape unit 4, there is formed an extending member 41 which extends the transfer tape T drawn out of the supply bobbin 21 before the transfer tape T is brought to the take-up bobbin 31. The extending member 41 is structured so that the transfer tape T can be extended between the transfer head 5 in the state where it is accommodated into the case 10 and the opening portion 10*c* of the case 10 when the tape unit 4 is accommodated into the case 10. For example, the extending member 41 is structured as a pair of extending members 41 which protrude in a direction toward the opening portion 10*c* when the tape unit 4 is accommodated into the case 10, and make the pair in a direction perpendicular to rotation axes of the supply bobbin 21 and the take-up bobbin 31 (direction in which the transfer tape T runs).

Note that, in this embodiment, when viewed from the side attached onto the case lower portion 10*b*, the transfer tape T is wound clockwise around the supply bobbin 21, and is wound anti-clockwise around the take-up bobbin 31. Hence, in the description of this embodiment, in the operation at the time of the transfer (operation in which the transfer tape T is supplied from the supply bobbin 21), a direction in which the supply bobbin 21 and the supply reel 2 or the take-up bobbin 31 and the take-up reel 3 rotate (anti-clockwise direction) is represented as a "normal rotation (direction)", and a direction in which the supply bobbin 21 (supply reel 2) or the take-up reel 3 rotates reversely to the direction mentioned above is represented as a "reverse rotation (direction)".

Further, in the tape unit 4 in this embodiment, the take-up bobbin 31 is structured so as not to rotate reversely. (Construction of Supply Reel)

The supply reel 2 is also formed by resin molding, and includes a gear 2*a* formed on a peripheral edge thereof, and a clutch 22 with a slip mechanism engaged with the supply bobbin 21 built in the tape unit 4.

The supply reel 2 is loosely inserted into a shaft portion 10*d* erected on the case lower portion 10*b*, and is attached thereto so as to be freely rotatable. The gear 2*a* formed on the peripheral edge of the supply reel 2 meshes with a reel-interlocking gear 6. The reel-interlocking gear 6 corresponds to reel interlocking means mentioned in claims of this invention.

Further, a gear 2*b* smaller in diameter than the gear 2*a* is formed on a surface of the supply reel 2 on a side of the case lower portion 10*b*, and is set capable of meshing with a gear 103 to be described later. (Construction of Reel-Interlocking Gear)

The reel-interlocking gear 6 is loosely inserted into a shaft portion 10*e* erected on the case lower portion 10*b*, and is attached thereto so as to be freely rotatable, and meshes with the gear 2*a* of the supply reel 2 and a gear 3*a* of the take-up reel 3. By providing the reel-interlocking gear 6, the supply reel 2 and the take-up reel 3 are interlocked with each other, thereby being rotatable in the same direction.

Note that the "interlocking" in this embodiment means that a rotation of one rotor is transmitted as it is to the other rotor as in an operational relationship between the supply reel 2 and the take-up reel 3, and the reel-inter locking gear 6 meshing therewith. Hence, in the transfer operation, the take-up bobbin 31 and the take-up reel 3 are "interlocked" with each other in the normal rotation direction. However, in the case of operation in which the transfer head 5 protrudes, since the rotation of the supply bobbin 21 and the rotation of the supply reel 2 are differentiated from each other on purpose by the above-described slip mechanism, the rotation of the supply bobbin 21 is not transmitted as it is to the supply reel 2, and this state can be regarded as a state where the "interlocking" is released. (Construction of Take-up reel)

Figure 5A:
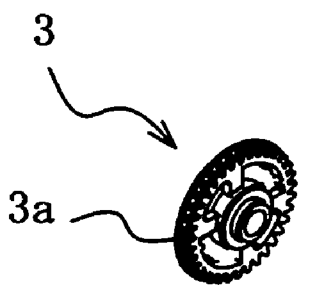
FIGS. 5A to 5C are views each showing a construction of a winding mechanism of the coating film transfer tool according to the embodiment of the present invention.
Figure 5B:
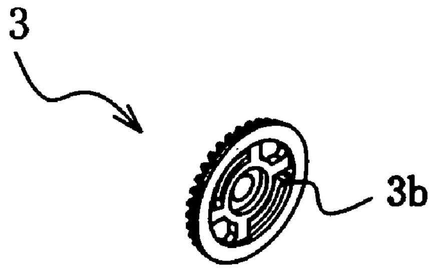
Figure 5C:
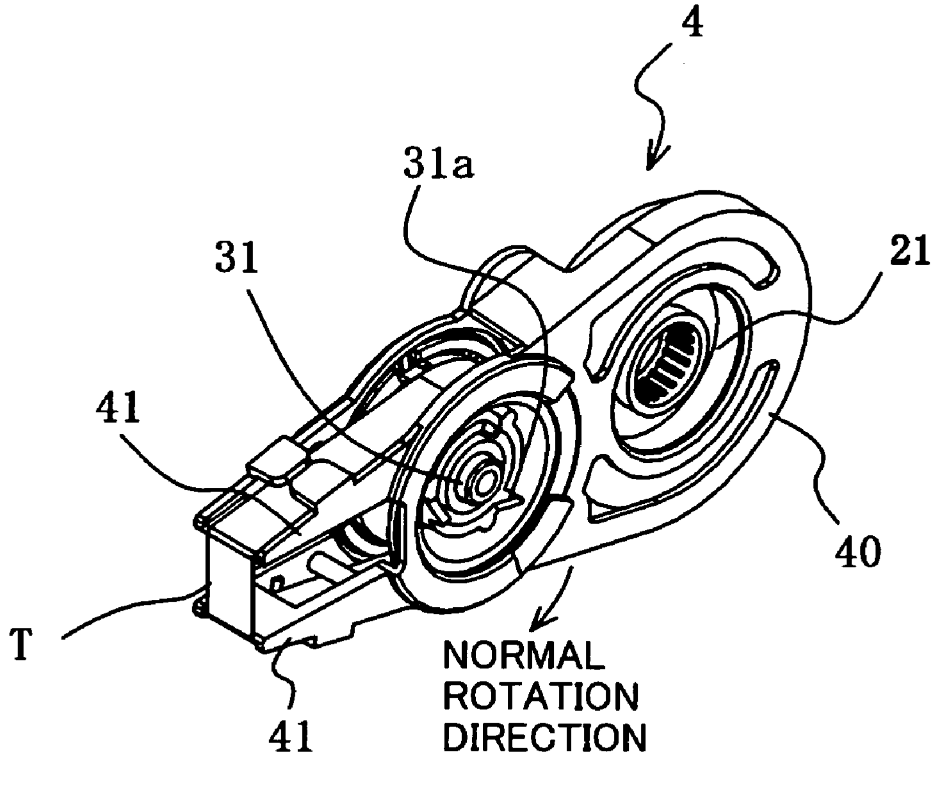

FIGS. 5A to 5C are views each showing a construction of a winding mechanism composed by the interlocking of the take-up reel 3 and the take-up bobbin 31 in this embodiment: FIG. 5A is a perspective view of the take-up reel 3 showing a side opposed to the case lower portion 10*b*; FIG. 5B is a perspective view of the take-up reel 3 showing a side opposed to the case upper portion 10*a*; and FIG. 5C is a perspective view of the tape unit including the take-up bobbin 31 to be engaged with the take-up reel 3.

The take-up reel 3 is loosely inserted into a shaft portion 10*f* erected on the case lower portion 10*b*, and is attached thereto so as to be freely rotatable. The gear 3*a* provided on the peripheral edge of the take-up reel 3 as shown in FIG. 5A is meshed with the reel-interlocking gear 6.

Further, as shown in FIG. 5B, on an inner circumference of the take-up reel 3, an engaging claw 3*b* in which a tip portion is erected toward the case upper portion 10*a* is formed.

Further, as shown in FIG. 5C, on an inner edge portion of the take-up bobbin 31, there is provided a stopping rib 31*a* formed into a shape with which the stopping rib 31*a* is collided with the stopping claw 3*b* when the take-up bobbin 31 rotates normally and idles without being collided with the stopping claw 3*b* when the take-up reel 3 rotates reversely.

Hence, in the case of attaching the tape unit 4 into the case 10, the take-up reel 3 and the take-up bobbin 31 are attached to each other, and in an initial state, the stopping rib 31*a* and the stopping claw 3*b* are collided with each other.

Then, when the take-up bobbin 31 or the take-up reel 3 rotates normally, the take-up reel 3 and the take-up bobbin 31 are interlocked with each other, and rotate in the normal rotation direction as shown in FIG. 5C. When the take-up reel 3 rotates reversely, only the take-up reel 3 rotates reversely while the take-up bobbin 31 is held unrotated.

Note that, though the construction in which the used transfer tape T is wound around the take-up bobbin 31 attached to the take-up reel 3 is shown in this embodiment, the present invention is not limited to this, and it is possible to adopt a construction in which the transfer tape T is directly wound around the take-up reel 3. (Construction of Slip Mechanism)

The slip mechanism (clutch 22 with the slip mechanism) is structured by accommodating a shaft 22*b* engaged with the supply bobbin 21 in a accommodating protrusion 22*a* formed on a surface of the supply reel 2 on a side opposed to the tape unit 4.

The supply reel 2 in which the shaft 22*b* is accommodated into the accommodating protrusion 22*a* is axially supported on the shaft 10*d* so as to be rotatable by fitting and inserting the shaft 10*d* erected on the case lower portion 10*b* into a fitting hole (not shown) common to the shaft 22*b* and the supply reel 2.

Then, the rotation of the supply bobbin 21 can be transmitted to the supply reel 2 through the slip mechanism (the clutch 22 with the slip mechanism).

In such a way, as a friction clutch formed of the accommodating protrusion 22*a* and the shaft 22*b*, the slip mechanism (the clutch 22 with the slip mechanism) of this embodiment have a function for equalizing a drawn amount of the transfer tape T drawn out of the supply bobbin 21 and a wound amount of the used transfer tape T wound around the take-up bobbin 31 each other, and for keeping tension of the transfer tape T constant.

Further, the slip mechanism (clutch 22 with the slip mechanism) of this embodiment functions when the transfer tape T is drawn out of the supply bobbin 21 at the time of sliding operation and transfer operation of the transfer head 5, which will be described later.

To be specific, when the operation to protrude the transfer head 5 is performed, the transfer tape T must be drawn out of the supply bobbin 21 and/or the take-up bobbin 31 because the transfer tape T is pulled by the transfer head 5. Here, the take-up bobbin 31 does not rotate because the take-up bobbin 31 rotates only in the normal rotation direction. As a result, the take-up reel 3, the reel-interlocking gear 6, and the supply reel 2 do not rotate, either. Accordingly, the transfer tape T is drawn out of the supply bobbin 21, thereby the supply bobbin 21 rotates by skipping with respect to the supply reel 2 in the normal rotation direction.

Further, in the case of the transfer operation, the slip mechanism functions so that the wound amount of the used transfer tape T wound around the take-up bobbin 31 exceeds the drawn out amount of the transfer tape T. Thus, a sag of the transfer tape T is prevented. Meanwhile, before the tension of the transfer tape T is heightened more than necessary, the shaft portion 22*b* is slid with respect to the accommodating protrusion 22*a*, so the tension of the transfer tape T is lowered. Thus, the transfer tape T is prevented from being cut off, and the tension of the transfer tape is kept substantially constant.

Here, a shape of the shaft 22*b* constituting clutch 22 with the slip mechanism as the slip mechanism of this embodiment is formed into such a structure as to, when the supply bobbin 21 rotates normally, transmit the rotation to the supply reel 2 with larger torque (with which the shaft 22*b* is difficult to slide with respect to the accommodating protrusion 22*a*), and to, when the supply reel 2 rotates reversely, transmit the rotation to the supply bobbin 21 with smaller torque (with which the shaft 22*b* is easy to slide with respect to the accommodating protrusion 22*a*). (Construction of Transfer Head)

The transfer head 5 includes, in a front thereof, a roller 51 which has the same rotation axis as those of the supply reel 2 and the take-up reel 3. The roller 51 assists in smoothing the running of the transfer tape T by suspending the transfer tape T drawn out of the supply bobbin 21 on the way and wound around the take-up bobbin 31 on the way. (Construction of Slide Mechanism)

The slide mechanism 100 as a characteristic portion of the present invention is disposed so as to slide with respect to an inner surface of the case lower portion 10*b*, and is mainly composed of a coupling portion 102 having the transfer head 5 fixed to its tip portion. Then, the slide mechanism 100 includes the coupling portion 102 which allows the transfer head 5 to protrude from the opening portion 10*c* of the case 10 and accommodates the transfer head 5 therein, an operating portion 101 disposed so as to slide along a slide groove 10*h* of the case lower portion 10*b* (refer to FIG. 1) formed in an outer surface of the case lower portion 10*b*, the gear 103 which meshes with a rack-like gear structure of a transmission portion 102*b* of the coupling portion 102 and rotates the supply reel 2 in response to a slide displacement when the transfer head 5 is accommodated into the case 10 after it is used, and a spring portion 104 which assists in operating (sliding) the operating portion 101 to thereby allow the transfer head 5 to protrude from the opening portion 10*c* of the case 10, and fix the transfer head 5 when the coating film transfer tool is used, and in operating (sliding) the operating portion 101 to thereby accommodate the transfer head 5 into the case 10.

The coupling portion 102 is formed to be a flat plate shape in which a through hole 102*a* is formed in the center of the coupling portion 102, and at an end portion of the coupling portion 102 in the protruding direction, the transfer head 5 is disposed. The coupling portion 102 is disposed so that the above-described shaft portion 10*d* and shaft portion 10*e* can be fitted and inserted into the through hole 102*a*. As a result, the coupling portion 102 slides in the "protruding direction" and the "accommodating direction" while being sandwiched between the case lower portion 10*b*, and the supply reel 2 and the take-up reel 3.

Further, on an inner edge portion of the through hole 102*a* of the coupling portion 102, there is formed a transmission portion 102*b* with a sawtooth shape. The gear 103 fitted with a play through the through hole 102*a* to an elliptical concave portion 10*g* formed on the case lower portion 10*b* meshes with the transmission portion 102*b*. The gear 103 is slidable in the "protruding direction" and the "accommodating direction" in such a manner that the concave portion 10*g* is formed to have the elliptical shape having a longitudinal concave portion in the "protruding direction" and the "accommodating direction".

Figure 6A:
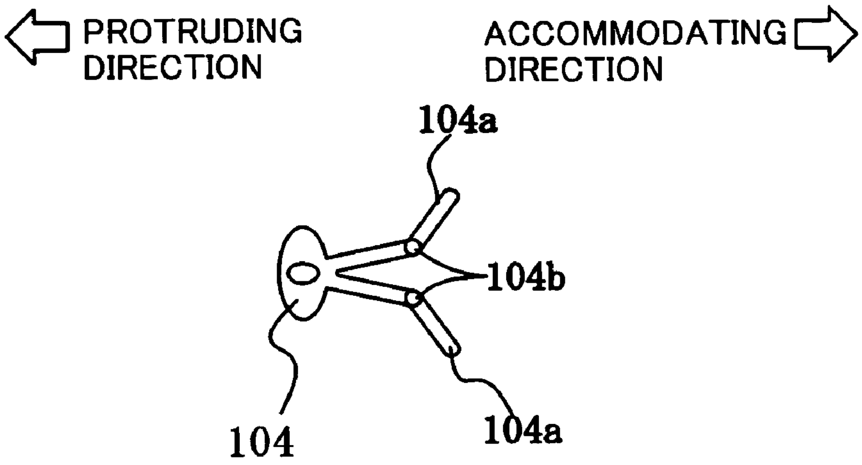
FIGS. 6A and 6B are views each showing a construction of a slide mechanism of the coating film transfer tool according to the embodiment of the present invention.

As shown in FIG. 6A, the spring portion 104 is accommodated in the slide groove 10*h* (refer to FIG. 1) formed on the case lower portion 10*b* and is connected to the coupling portion 102 through the case lower portion 10*b*. Further, in the spring portion 104, there are provided two engaging pieces 104*a* engaging engaging grooves 10*i* formed in a side wall portion of the slide groove 10*h*.

Each of the engaging pieces 104*a* is provided with, on a surface side thereof on which the operating portion 101 is disposed, a protruding portion 104*b*.

Figure 6B:
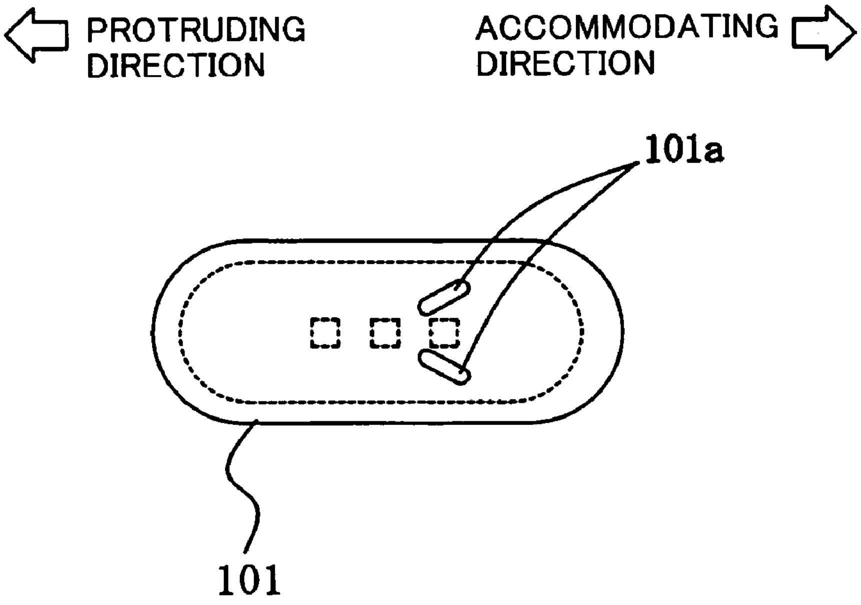

As shown in FIG. 6B, in the operating portion 101, engaging grooves 101*a* are formed on a surface opposite to the engaging pieces 104*a* (spring portion 104), and the protruding portions 104*b* engages the engaging grooves 101*a*.

Figure 7:
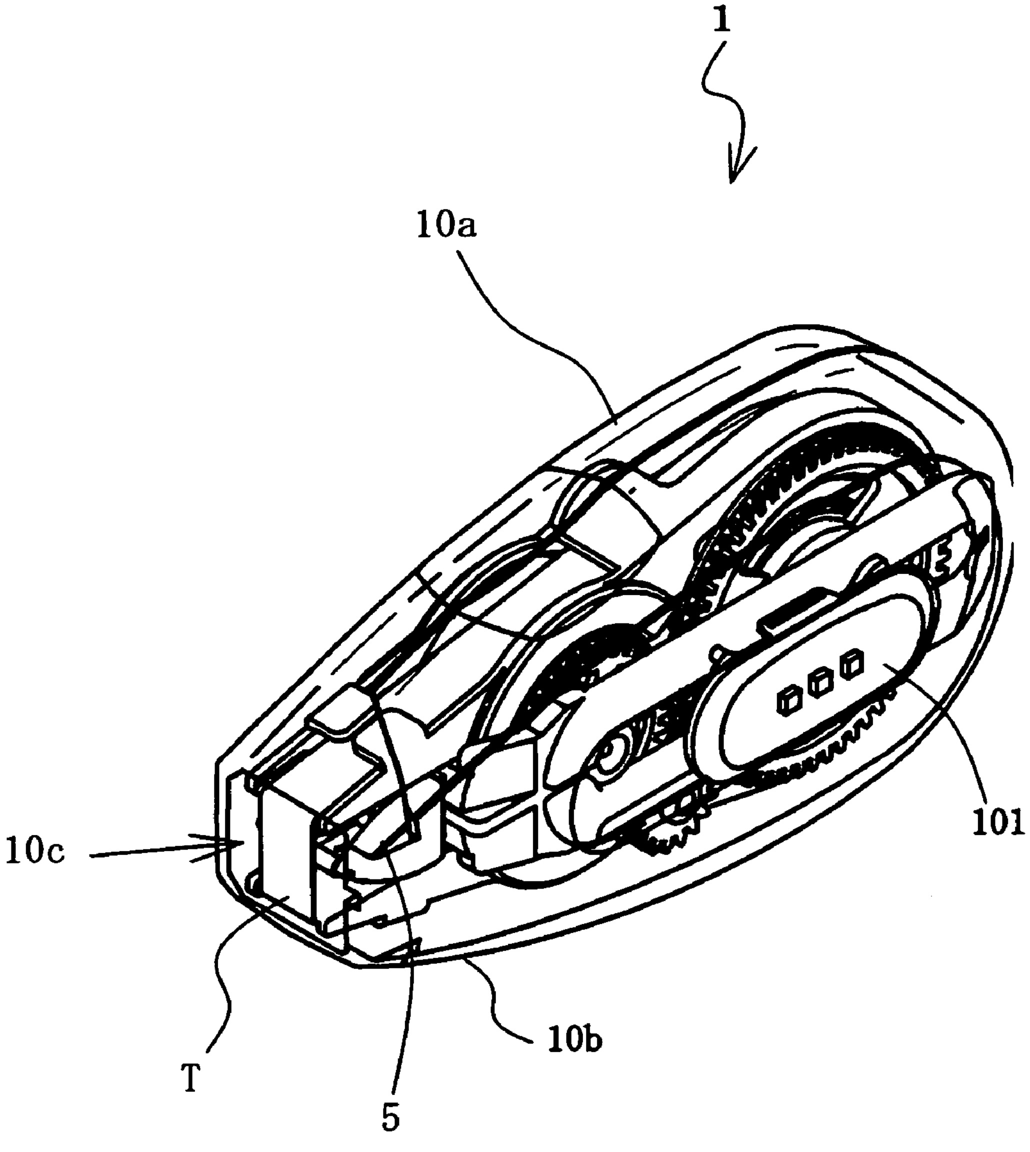
FIG. 7 is a transparent perspective view showing the construction of the coating film transfer tool according to the embodiment of the present invention.
Figure 8:
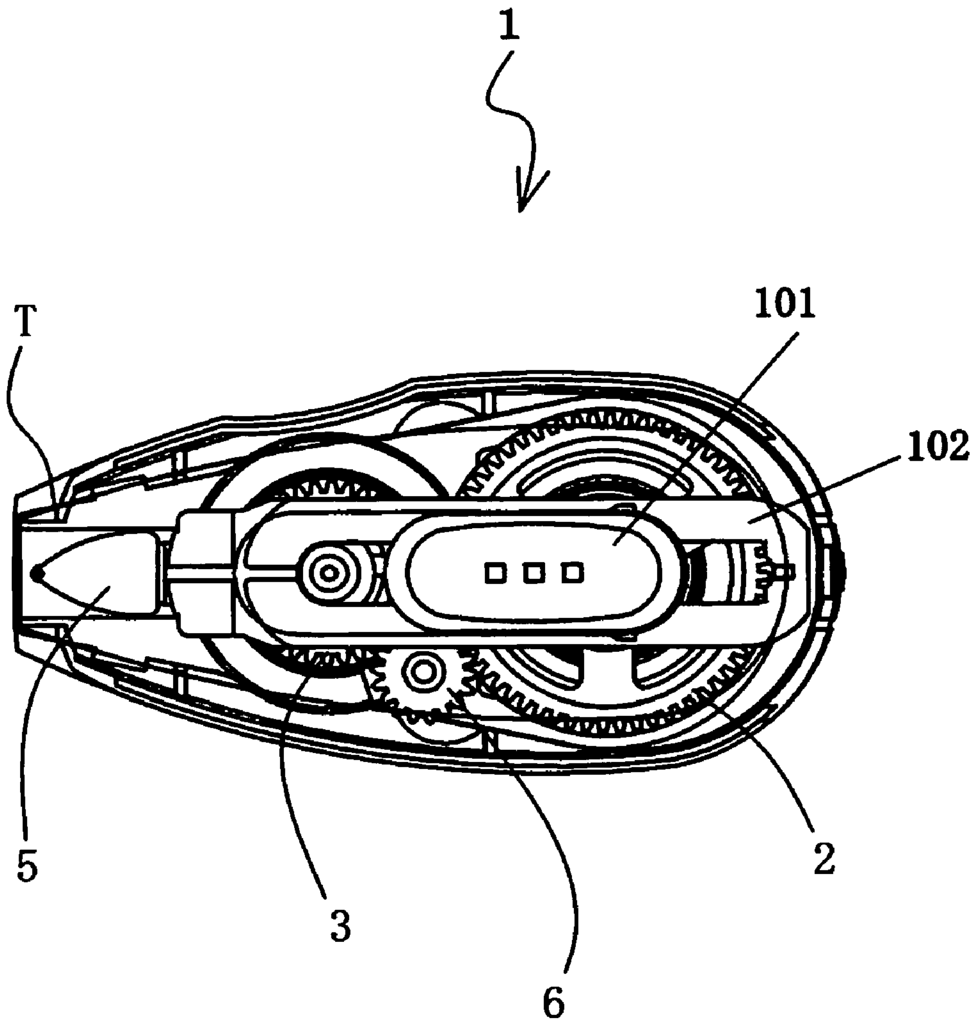
FIG. 8 is a transparent side view showing the construction of the coating film transfer tool according to the embodiment of the present invention.
Figure 9:
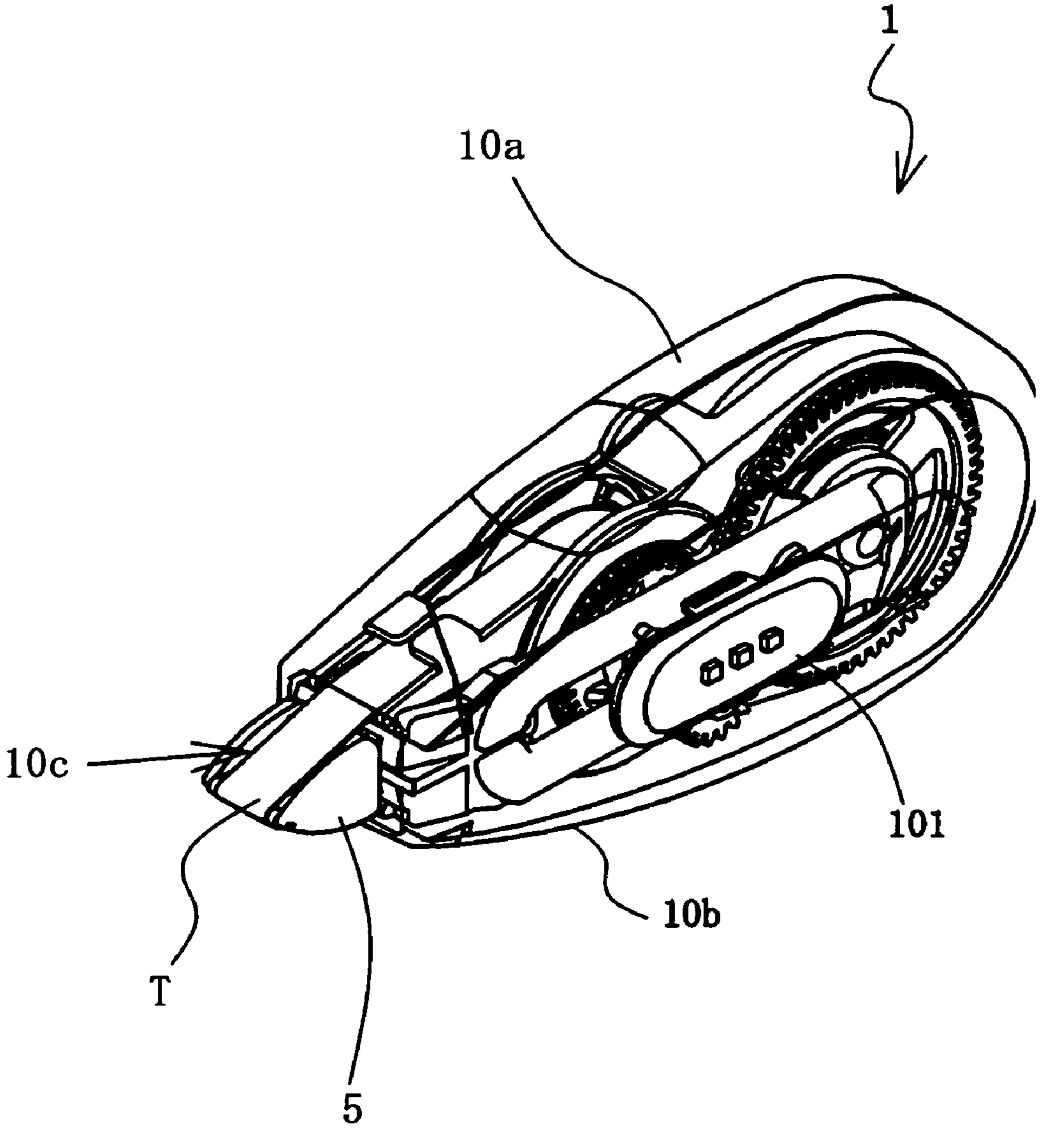
FIG. 9 is a transparent perspective view showing the construction of the coating film transfer tool according to the embodiment of the present invention.
Figure 10:
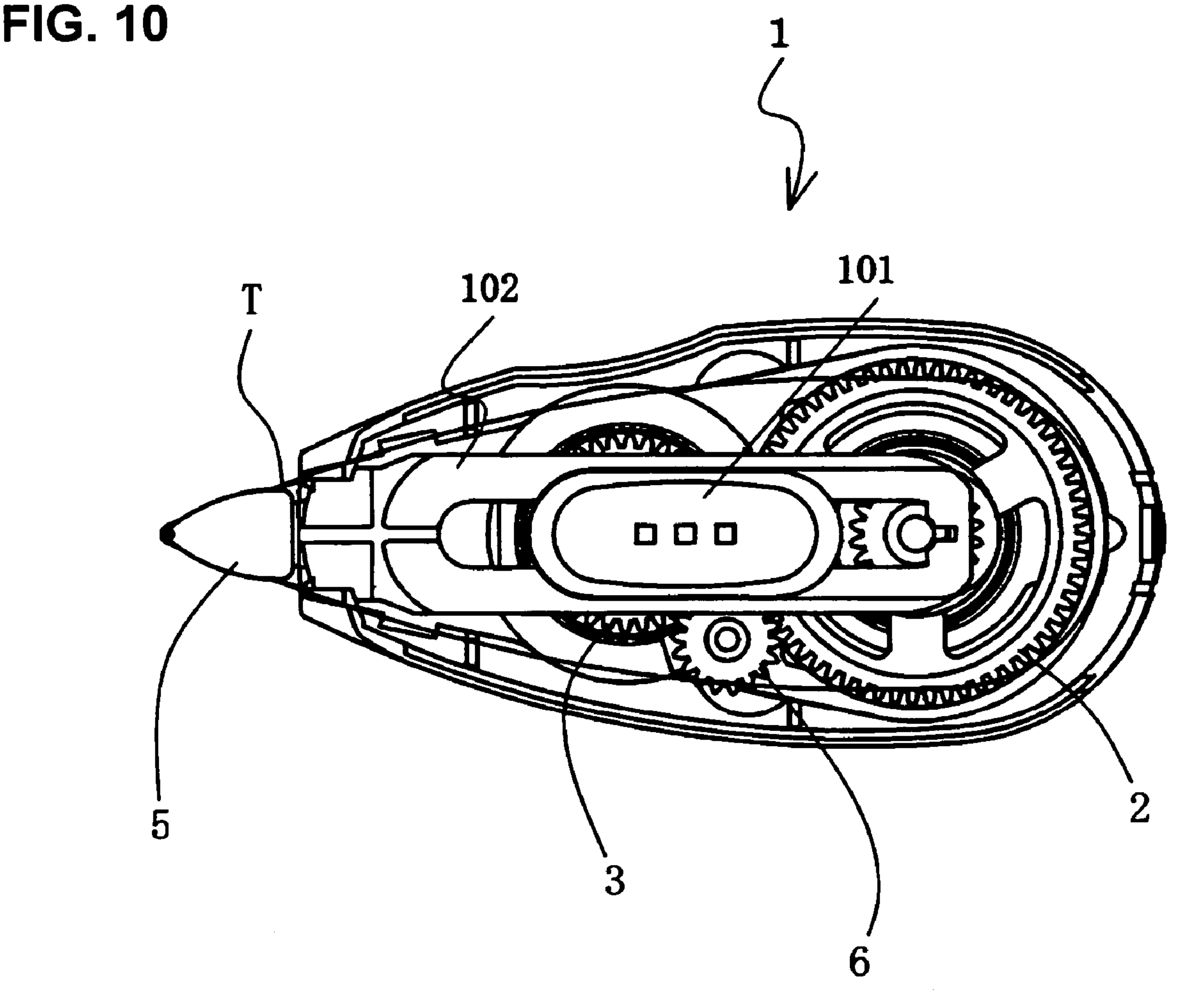
FIG. 10 is a transparent side view showing the construction of the coating film transfer tool according to the embodiment of the present invention.

Next, a description will be made of the operations in an embodiment of the coating film transfer tool according to the present invention with reference to the drawings. FIGS. 7 to FIG. 11F are views for explaining the operation in this embodiment: FIG. 7 is a transparent perspective view of the coating film transfer tool according to this embodiment when the transfer head is accommodated; FIG. 8 is a transparent side view of the coating film transfer tool according to this embodiment when the transfer head is accommodated; FIG. 9 is a transparent perspective view showing the coating film transfer tool according to this embodiment when the transfer head protrudes; FIG. 10 is a transparent side view of the coating film transfer tool according to this embodiment when the transfer head protrudes; and FIGS. 11A to 11F are side views each showing a fixing mechanism constituting a part of the slide mechanism according to this embodiment.

As shown in FIG. 7 and FIG. 8, in the coating film transfer tool 1 in a state where the transfer head 5 is accommodated in the case 10, the operating portion 101 is located in the vicinity of an end portion of the slide groove 10*h* in the accommodating direction. The supply reel 2 with the supply bobbin 21 attached, the take-up reel 3 with the take-up bobbin 31 attached, and the reel-interlocking gear 6 which transmits the rotation of the supply reel 2 to the take-up reel 3, are in a static state.

Further, the transfer tape T drawn out of the supply bobbin 21 extends between the extending members 41 and 41 formed on an end portion of the tape unit 4 in the protruding direction, and is wound around the take-up bobbin 3. The transfer tape T suspended between the extending members 41 and 41 is located so as to cover the inside of the opening portion 10*c*.

Here, when the operating portion 101 is slid in the protruding direction along the slide groove 10*h* by the user, as shown in FIG. 9 and FIG. 10, the transfer head coupled to the operating portion 101 through the coupling portion 102 protrudes to the outside of the case 10 while being sandwiched between the extending members 41 and 41.

Hence, the transfer head 5 protrudes to the outside of the case 10 in a state where the transfer tape T extending between the extending members 41 and 41 is suspended on the roller 51 (refer to FIG. 2).

In this case, in the inside of the case 10, the take-up bobbin 31 is constructed so as not to rotate reversely, so the rotation is not transmitted to the take-up reel 3 while the above-described stopping rib 31*a* and stopping claw 3*b* are in collision with each other, and the reel-interlocking gear 6 and the supply reel 2 are also fixed. Accordingly, the transfer tape T suspended on the roller 51 of the transfer head 5 is drawn out of the supply bobbin 21 which rotates normally, while being slid with respect to the supply reel 2, by the slip mechanism by a length corresponding to a moving displacement of the protruded transfer head 5.

Note that the take-up bobbin 31 does not rotate reversely during a protrusion action of the transfer head 5, so the supply reel 2 interlocked therewith through the reel-interlocking gear 6 does not rotate reversely, either.

Hence, in the clutch 22 with the slip mechanism which couples the supply reel 2 and the supply bobbin 21 to each other, the shaft portion 22*b* engaged with the supply bobbin 21 rotates while being slid with respect to the accommodating protrusion 22*a*.

The transfer head 5 protruding to the outside of the case 10 is set in the usage state, and is fixed so as not to be accommodated into the case 10 unexpectedly. A description will be made of such a fixing mechanism with reference to FIG. 11A to FIG. 11C.

As described above, the transfer head 5 is connected to the spring portion 104 and the operating portion 101 through the coupling portion 102. Hence, the above-described fixing mechanism consists of the slide groove 10*h* formed in the case lower portion 10*b*, the spring portion 104 sliding in the slide groove 10*h*, and the operating portion 101 which controls the spring portion 104.

FIGS. 11A to 11F are views showing operations of the fixing mechanism as a part of the slide mechanism in this embodiment. Those figures show operations of the operating portion 101 and the spring portion 104 with respect to the slide groove 10*h* formed in the case lower portion 10*b* and with respect to the engaging grooves 10*i* formed on the side wall portion of the slide groove 10*h*.

Figure 11A:
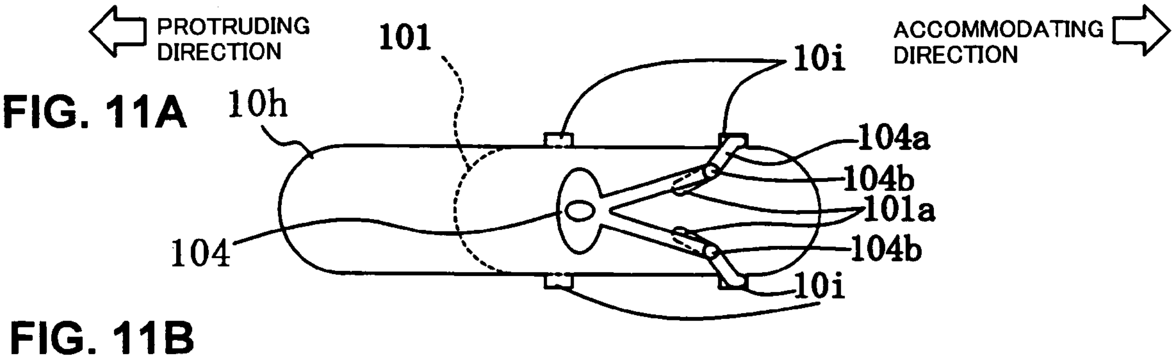
FIGS. 11A to 11F are views showing operations of the slide mechanism of the coating film transfer tool according to the embodiment of the present invention.

As shown in FIG. 11A, the engaging pieces 104*a* and 104*a* of the spring portion 104 accommodated in the slide groove 10*h* are respectively engaged with the pair of engaging grooves 10*i* on the side of the accommodating direction in a state where the transfer head 5 is accommodated into the case 10.

Figure 11B:
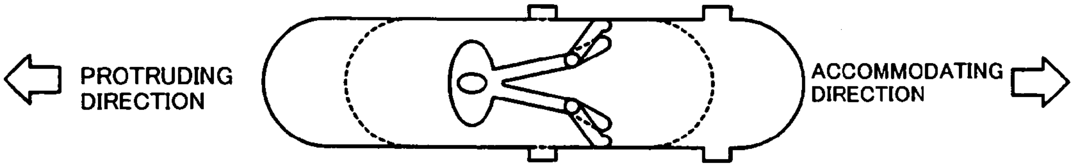

When the user slides the operating portion 101 in the protruding direction, as shown in FIG. 11B, the respective engaging pieces 104*a* and 104*a* smoothly detach from the engaging grooves 10*i* since the engaging pieces 104*a* and 104*a* form a shape open to the accommodating direction ("V" shape open to the accommodating direction).

Figure 11C:
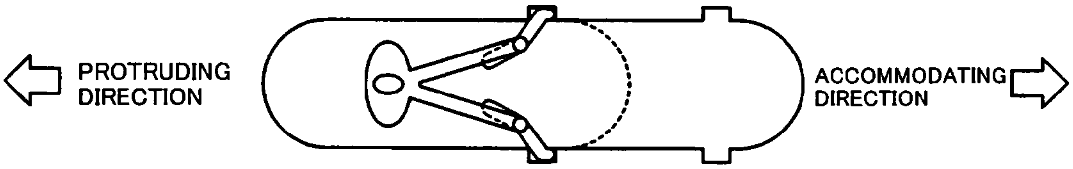
Figure 11D:
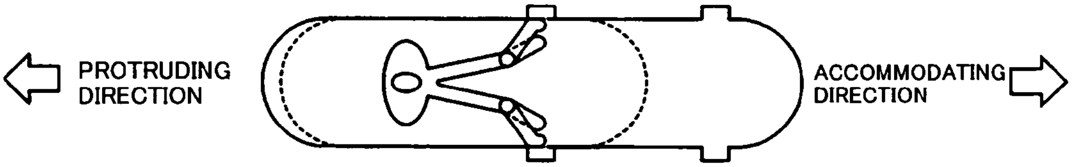
Figure 11E:
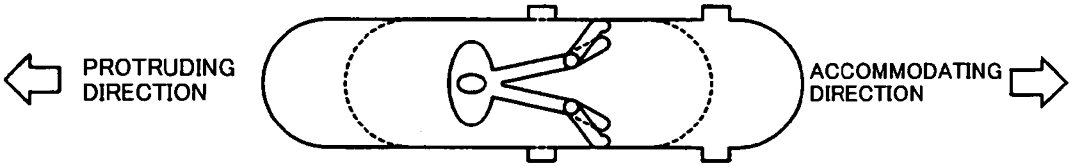
Figure 11F:
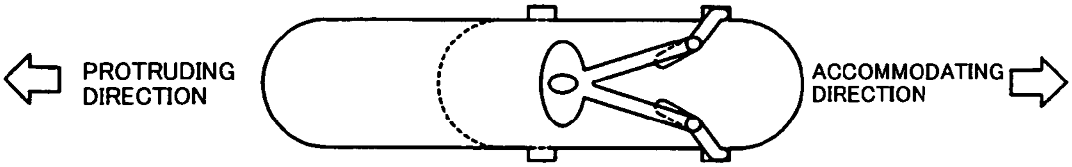

Then, when the operating portion 101 is slid in the protruding direction, and the transfer head 5 completely protrudes to the outside of the case 10, as shown in FIG. 11C, the respective engaging pieces 104*a* and 104*a* are engaged with the pair of engaging grooves 10*i* on the side of the protruding direction.

As described above, the respective engaging pieces 104*a* and 104*a* form the shape open to the accommodating direction, so the respective engaging pieces 104*a* and 104*a* get into a state in which they hardly detach from the pair of engaging grooves 10*i* on the side of the protruding direction, and the spring portion 104 gets into a fixed state with respect to the accommodating direction. As a result, the transfer head 5 is also fixed through the coupling portion 102.

In a state where the transfer head 5 protrudes from the case body 10, the coating film transfer tool 1 is used. When in use, while orienting the case lower portion 10*b* to the left with respect to the transfer target, the transfer head 5 on which the transfer tape T is suspended is pressed against the transfer target, and the coating film transfer tool 1 is pulled toward the user (the transfer tape T is made to run). Thus, the supply bobbin 21 rotates normally, and the rotation thereof is transmitted to the reel-interlocking gear 6 through the clutch 22 with the slip mechanism and the supply reel 2, and then transmitted to the take-up reel 3, thereby rotating the take-up bobbin 31 normally. Thus, the used transfer tape T is wound around the take-up bobbin 31.

Also at this time, by the clutch 22 with the slip mechanism, the amount of the transfer tape T drawn out of the supply bobbin 21 and the amount of the transfer tape T wound around the take-up bobbin 31 are kept approximately equal to each other, and the degree of tension of the transfer tape T is maintained constant.

Thereafter, when the use of the coating film transfer tool 1 is finished and the transfer head 5 is accommodated into the case 10 again, the user slides the operating portion 101 in the accommodating direction, to thereby accommodate the transfer head 5 into the case 10 through the spring portion 104 and the coupling portion 102, which are connected to the operating portion 101. At this time, the slide mechanism of the present invention realizes the transfer tape T to be appropriately accommodated as well as the transfer head 5 to be accommodated into the case 10.

To be specific, first, in the above-described protruding operation of the transfer head 5, as the coupling portion 102 slides in the protruding direction, the gear 103 meshed with the transmission portion 102*b* is made apart from the gear 2*b* of the supply reel 2, so the transmission portion 102*b* and the gear 2*b* become out of mesh. This results from the fact that the gear 103 moves in the protruding direction because the concave portion 10*g* is formed into the elliptical shape having the longitudinal opening in the protruding direction and the accommodating direction.

Hence, when the accommodating operation of the transfer head 5 is performed, the coupling portion 102 slides in the accommodating direction following the accommodating operation, and the gear 103 thus slides in the accommodating direction along the longitudinal concave portion 10*g*, and then meshes with the gear 2*b*.

Then, the accommodating operation of the transfer head 5 is continued, the coupling portion 102 slides in the accommodating direction, and the gear 103 thus meshes with the transmission portion (rack-like gear) 102*b* and rotates normally. Then, the gear 2*b* of the supply reel 2, which meshes with the gear 103, rotates reversely. Then, the take-up reel 3 also rotates reversely through the reel-interlocking gear 6. Here, the stopping claw 3*b* is formed into a shape not to be collided with the stopping rib 31*a* at the time of such a reverse rotation. Accordingly, even if the take-up reel 3 rotates reversely, the rotation is not transmitted to the take-up bobbin 31.

Hence, the supply reel 2 rotates reversely through the transmission portion 102*b* formed on the coupling portion 102 and through the gear 103 in interlocking with the accommodating operation of the transfer head 5. Then, the transfer tape T drawn out by the protruding operation of the transfer head 5 is wound by the supply bobbin 21, thus making it possible to return the transfer tape T extended by the extending portions 41 and 41 to an initial position (see FIG. 7) so as to cover the inside of the opening portion 10*c*.

Note that the length of the longitudinal concave portion 10*g* is designed to an extent where the gear 103 and the gear 2*b* can be out of mesh, and where the gear 103 can mesh with the gear 2*b* as quickly as possible in the case of performing the accommodating operation of the transfer head 5.

Also at this time, the degree of tension of the transfer tape T is maintained constant by the clutch 22 with the slip mechanism. Note that, even if the other end of the transfer tape T of which one end is fixed to be tensioned by the fixed (irrotational) take-up bobbin 31 is pulled too much by the reverse rotation operation of the supply bobbin 21, the transfer tape T does not suffer breakage which may be caused by being pulled excessively. This is because, as described above, the shaft 22*b* is formed into the shape with which the shaft 22*b* easily slips with respect to the accommodating protrusion 22*a* when the supply reel 2 attached to the shaft 22*b* rotates reversely, and accordingly, even if the tension of the transfer tape T reaches some extent or more, the supply bobbin 21 slips with respect to the supply reel 2.

Next, a description will be made below of operations of the above-described fixing mechanism in the accommodating operation of the transfer head 5 with reference to FIGS. 11C to 11F.

When the transfer head 5 protrudes to the outside of the case 10, as shown in FIG. 11C, the respective engaging pieces 104*a* and 104*a* are individually engaged with the pair of engaging grooves 10*i* provided on the side of the protruding direction.

Here, to start the accommodating operation of the transfer head 5 means to slide the operating portion 101 in the accommodating direction. Further, the protruding portions 104*b* provided on the engaging pieces 104*a* and 104*a* are engaged with the engaging grooves 101*a* of the operating portion 101. The engaging grooves 101*a* are formed into a shape open to the accommodating direction ("V" shape open to the accommodating direction).

To be specific, when the accommodating operation of the transfer head 5 starts, the protruding portions 104*b* function so as to bring the engaging pieces 104*a* and 104*a* near to each other along the shape of the engaging grooves 101*a* of the operating portion 101. The engaging pieces 104*a* and 104*a* leave the pair of engaging grooves 10*i* provided on the side of the protruding direction, and the fixing of the transfer head 5 is released.

Then, when the operating portion 101 is kept on being slid in the accommodating direction, the engaging pieces 104*a* and 104*a* slides along the side surface of the slide groove 10*h* as shown in FIG. 11. Then, when the transfer head 5 is completely accommodated into the case 10, the respective engaging pieces 104*a* and 104*a* are again engaged with the pair of engaging grooves 10*i* provided on the side of the accommodating direction as shown in FIG. 11F.

As described above, according to the present invention, there can be provided a coating film transfer tool capable of eliminating the sag when being used, while protecting the transfer tape when not being used since the slide mechanism is provided.

Further, in addition to the slide mechanism, the slip mechanism is provided in the supply reel. Accordingly, the sag of the transfer tape is eliminated even when repeating the protruding operation/accommodating operation of the transfer head, thus making it possible to always set the coating film transfer tool 1 in a state ready for use.

What is claimed is:

1. A coating film transfer tool, comprising:

a case including:

a supply bobbin which is rotatable, and has a transfer tape wound therearound, wherein the transfer tape has a coating film thereon:

a supply reel which is rotatable and has the supply bobbin attached thereonto;

a take-up bobbin which is rotatable only in a direction of winding up the transfer tape and has the transfer tape used after being drawn out of the supply bobbin wound therearound;

a take-up reel to which the take-up bobbin can be attached, rotating in the direction of winding up the transfer tape in interlocking with the take-up bobbin;

reel interlocking means for interlocking the supply reel and the take-up reel with each other; and a transfer head for transferring the coating film to a transfer target surface by pressing the transfer tape thereagainst and making the transfer tape run;

a slide mechanism which holds the transfer head and allows, without opening the case, the transfer head to slide and contact with the transfer tape from inside of the case, to protrude from the case along with the transfer tape, and to be accommodated into the case; and a slip mechanism for equalizing a drawn amount of the transfer tape drawn out of the supply bobbin and a wound amount of the transfer tape would around the take-up bobbin, wherein the slide mechanism has a structure such that when the transfer head is being accommodated by the slide mechanism, the slide mechanism is engaged with the supply reel and rotates the supply reel in reverse.

2. A coating film transfer tool according to claim 1, further comprising: an extending member for extending the transfer tape drawn out of the supply bobbin to feed the transfer tape to the take-up reel, wherein the slide mechanism allows the transfer tape extended by the extending member to be suspended on the transfer head, to cause the transfer tape to protrude to an outside of the case.

3. A coating film transfer tool according to claim 2, further comprising a unit in which the supply bobbin and the take-up bobbin are integrally assembled together with the extending member while making the supply bobbin and the take-up bobbin correspond to arrangement positions of the supply reel and the take-up reel in the case, wherein the unit is detachable from the case.

4. A coating film transfer tool according to claim 1, wherein the slide mechanism includes a fixing mechanism for fixing the transfer head when being made to perform the sliding operation to cause the transfer head to protrude from the case, and for releasing the fixing when being made to perform the sliding operation to accommodate the transfer head into the case.

5. A coating film transfer tool according to claim 1, wherein, when the sliding operation to accommodate the transfer head is performed, and the take-up reel rotates in a direction reverse to the direction of winding up the transfer tape during a reverse rotation of the supply reel, the take-up reel does not transmit the rotation thereof to the take-up bobbin.

6. A coating film transfer tool according to claim 1, further comprising a slide reel disposed with the supply reel that can make the supply reel rotate in reverse through rotation thereof, wherein the side mechanism comprises:

a coupling portion extending in a protruding direction of the transfer head and having a groove therein, which includes a rack-like gear formed in the protruding direction and is allowed to engage with the slide reel, and can be slid in an accommodating direction of the transfer head and in the protruding direction relative to the case; and a slide gear, which can be engaged with the slide reel by approaching the supply reel in response to accommodation of the transfer head, which can be disengaged with the slide reel by separating from the supply reel in response to start of protrusion of the transfer head, and, as a result of engagement with the groove in the coupling portion, can be pushed to the rack-like gear along with sliding of the coupling portion and thereby caused to rotate so as to rotate the slide reel.

7. A coating film transfer tool according to claim 1, wherein the slide mechanism further comprises an operating portion outside of the case and opposite to parts of the slide mechanism inside of the case, which can cause sliding of the slide mechanism.

* * * * *